(12) United States Patent
Wu et al.

(10) Patent No.: US 8,379,630 B2
(45) Date of Patent: Feb. 19, 2013

(54) METHODS AND APPARATUS RELATED TO CONTROLLING ACCESS TO COMMUNICATIONS RESOURCES

(75) Inventors: Xinzhou Wu, Monmouth Junction, NJ (US); Junyi Li, Chester, NJ (US); Sanjay Shakkottai, Austin, TX (US); Vincent D. Park, Budd Lake, NJ (US); Nilesh Khude, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 12/815,922

(22) Filed: Jun. 15, 2010

(65) Prior Publication Data
US 2011/0305208 A1 Dec. 15, 2011

(51) Int. Cl.
H04L 12/28 (2006.01)
(52) U.S. Cl. ....................................................... 370/351
(58) Field of Classification Search .................. 370/351, 370/389, 395.1, 395.4, 395.42; 709/204, 709/207
See application file for complete search history.

(56) References Cited

U.S. PATENT DOCUMENTS

| | | | | |
|---|---|---|---|---|
| 6,839,321 B1 * | 1/2005 | Chiruvolu | ................... | 370/230.1 |
| 6,862,265 B1 * | 3/2005 | Appala et al. | .................. | 370/235 |
| 7,292,580 B2 * | 11/2007 | Ramamurthy et al. | .. | 370/395.42 |
| 2003/0227926 A1 * | 12/2003 | Ramamurthy et al. | .. | 370/395.42 |
| 2009/0116439 A1 | 5/2009 | Madan et al. | | |
| 2009/0196219 A1 | 8/2009 | Chin et al. | | |
| 2010/0083386 A1 * | 4/2010 | Kline et al. | ...................... | 726/34 |

FOREIGN PATENT DOCUMENTS

| WO | WO2009097281 A1 | 8/2009 |
|---|---|---|
| WO | WO2009157962 A1 | 12/2009 |
| WO | WO2010038226 A1 | 4/2010 |

OTHER PUBLICATIONS

3rd Generation Partnership Project; Technical Specification Group Services and System Aspects; Quality of Service (QoS) concept and architecture (Release 9), 3GPP Standard; 3GPP TS 23.107, 3rd Generation Partnership Project (3GPP), Mobile Competence Centre ; 650, Route Des Lucioles ; F-06921 Sophia-antipolis Cedex ; France, No. V9.1.0, Jun. 10, 2010, pp. 1-41, XP050441549, [retrieved on Jun. 10, 2010].
International Search Report and Written Opinion—PCT/US2011/040570—ISA/EPO—Sep. 29, 2011.

* cited by examiner

*Primary Examiner* — Fan Ng
(74) *Attorney, Agent, or Firm* — James K. O'Hare

(57) ABSTRACT

Various methods and apparatus relate to controlling access to communications resources in a wireless communications system. Various described methods and apparatus are well suited for use in a peer to peer network in which resource access control is implemented in a distributed manner and wireless terminals compete for communications resources, e.g., compete for a peer to peer traffic segment. A wireless terminal generates QoS tokens within said wireless terminal at a rate which is a function of a QoS level associated with the wireless terminal and uses a generated token to control access to a communications resource. Generated tokens within the wireless terminal may be shared among the applications of the wireless terminal.

23 Claims, 14 Drawing Sheets

500

502

| QoS SERVICE LEVEL | TOKEN GENERATION RATES (TOKENS/SEC) | |
|---|---|---|
| | FIRST TYPE TOKENS, E.G., PERSISTENT TOKENS | SECOND TYPE TOKENS, E.G., NON-PERSISTENT TOKENS |
| FIRST, E.G., GOLD | RATE 1A, E.G., 2 | RATE 1B, E.G., 20 |
| SECOND, E.G., SILVER | RATE 2A, E.G., 1 | RATE 2B, E.G., 10 |
| THIRD, E.G., BRONZE | RATE 3A, E.G., 0 | RATE 3B, E.G., 5 |

504

| TOKEN TYPE | INDIVIDUAL TOKEN LIFETIME (SEC) |
|---|---|
| FIRST TYPE, E.G., PERSISTENT | LIFETIME LENGTH A, E.G., 5 SEC |
| SECOND TYPE, E.G., NON-PERSISTENT | LIFETIME LENGTH B, E.G., 20 SEC |

506

| TOKEN TYPE | MAXIMUM TOKEN ALLOWED TO ACCUMULATE |
|---|---|
| FIRST TYPE, E.G., PERSISTENT | MAX NUMBER A, E.G., 4 |
| SECOND TYPE, E.G., NON-PERSISTENT | MAX NUMBER B, E.G., 40 |

FIGURE 5

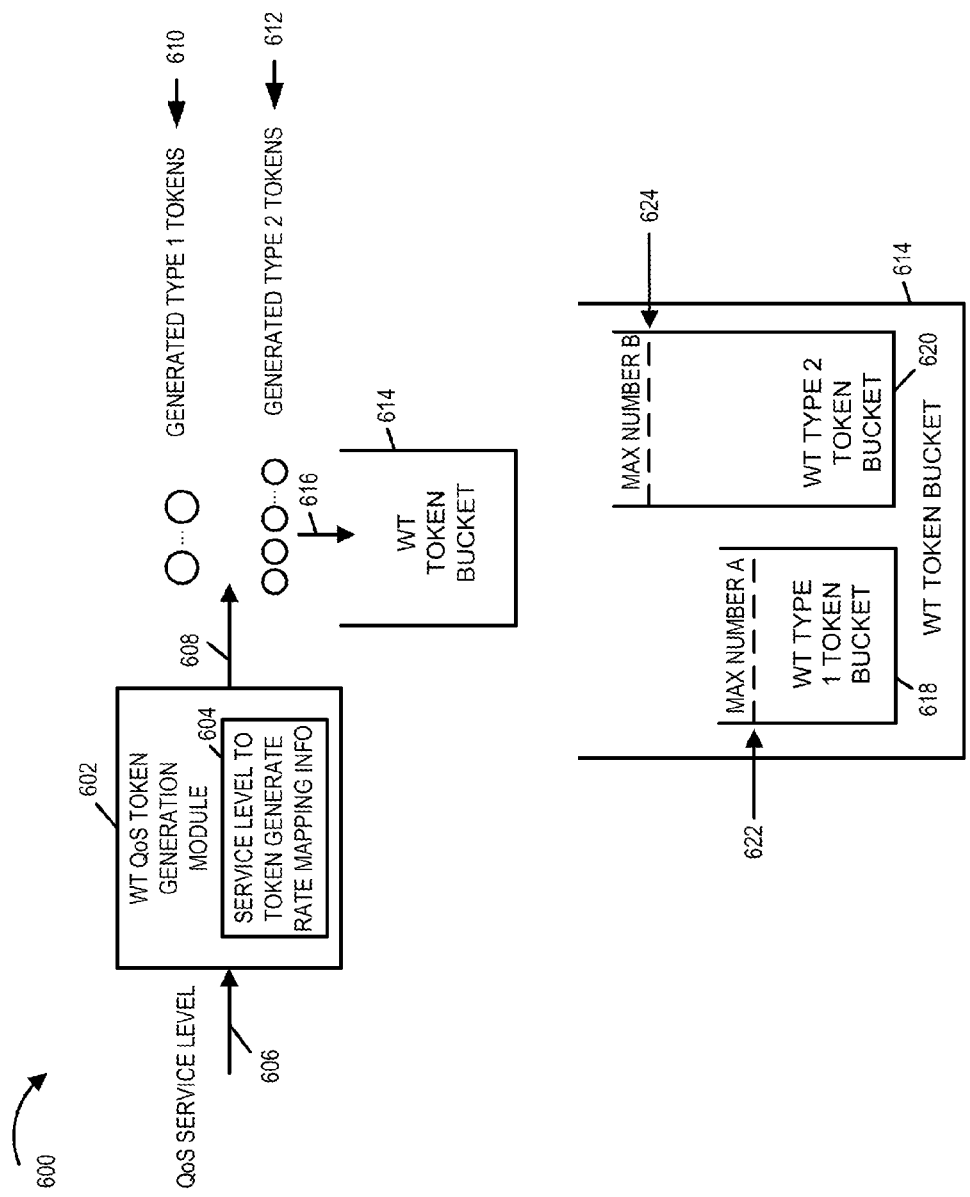

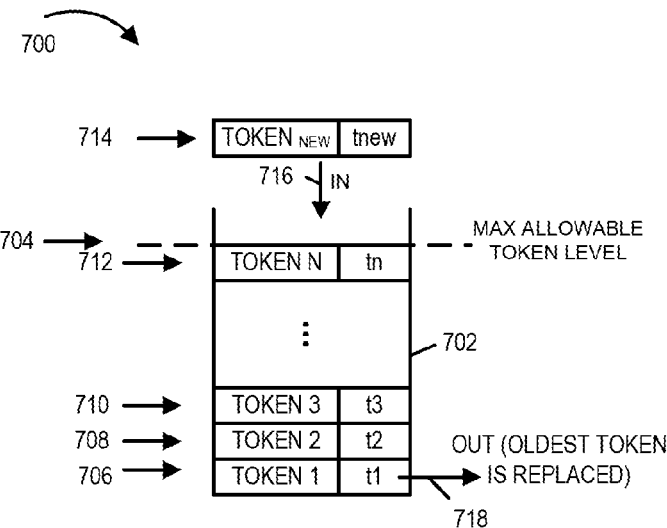

FIGURE 7

| TOKEN ALLOCATION RULES | |
|---|---|
| CONDITIONS | ALLOWABLE TOKEN ALLOCATIONS |
| AN APPLICATION HAS LATENCY DEPENDENT DATA WAITING TO BE COMMUNICATED | AN APPLICATION WITH LATENCY DEPENDENT DATA WAITING TO BE COMMUNICATED |
| NO LATENCY DEPENDENT APPLICATIONS ARE RUNNING | AN APPLICATION WITH BEST EFFORT DATA WAITING TO BE COMMUNICATED |
| ONE OR MORE LATENCY DEPENDENT APPLICATION ARE RUNNING BUT HAVE NO LATENCY DEPENDENT DATA WAITING TO BE COMMUNICATED AND A TOKEN IS ABOUT TO EXPIRE | AN APPLICATION WITH BEST EFFORT DATA WAITING TO BE COMMUNICATED |

FIGURE 8

METHODS AND APPARATUS RELATED TO CONTROLLING ACCESS TO COMMUNICATIONS RESOURCES

FIELD

Various embodiments relate to wireless communications, and more particularly, to methods and apparatus related to controlling access to communications resources.

BACKGROUND

In some ad-hoc wireless networks, medium access is controlled in a distributed manner through signaling sent and received by the contending nodes. The MAC protocol used in such systems normally assigns a statistically fair share of the medium, e.g., communications resources, to communications links on a long time scale. However, some applications, e.g. Voice over Internet Protocol (VoIP), multimedia etc., are sensitive to the scheduling delay and delay jitter and often require a certain Quality of Service (QoS) guarantee on a shorter time scale than is often provided for. In some systems, nodes with a high QoS status can get higher priority to access resources than other nodes with a lower QoS status.

Usually the QoS privileges that are given to a device are unrestricted meaning that the QoS privileges and signaling can potentially be used by the authorized device all or almost all the time. As a result, QoS privileges can be abused by applications running on an authorized user device, e.g., by using a high QoS privilege for a low priority application.

In such cases, the applications running on the user terminal can assert QoS even when they do not need any QoS and can hog a large portion of the resources. There is no incentive for the applications to restrict themselves from the using the QoS privileges.

Based on the above discussion there is a need for new methods and apparatus for controlling access to communications resources in a communications system which improves upon the known approaches for allocating and/or controlling access to communications resources in a communications system based on QoS privileges, e.g., a system without centralized control of resource allocation and/or use.

SUMMARY

Various methods and apparatus relate to controlling access to communications resources in a wireless communications system. Various described methods and apparatus are well suited for use in a peer to peer network in which resource access control is implemented in a distributed manner and wireless terminals compete for communications resources, e.g., compete for a peer to peer traffic segment and/or other communications resources.

In various embodiments an implemented distributed QoS mechanism using QoS tokens is advantageous in preventing and/or limiting the abuse of the QoS privileges by the applications and/or by an individual device and/or user seeking to access resources. A wireless terminal, in various embodiments, generates QoS tokens at a rate which is a function of its QoS level, e.g., its QoS service level. In some embodiments, there are limits on the maximum number of QoS tokens a wireless terminal is allowed to retain. In various embodiments, individual QoS tokens have individual lifetimes. QoS tokens are used to control access to communications resources, e.g., access to peer to peer traffic segments and/or other communications resources.

Various exemplary methods restrict the QoS privileges of a wireless terminal, e.g., by having the wireless terminal share it's generated QoS tokens among the different applications being executed by the wireless terminal. With this approach if a particular application within a wireless terminal unnecessarily asserts QoS and expends a token, the token may be unavailable for another application which may need to assert QoS, e.g., to satisfy a latency condition. Thus there is an incentive for a wireless terminal to implement applications which judiciously use the limited supply of QoS tokens available to the wireless terminal for use in gaining access to communications resources.

An exemplary method of operating a wireless terminal, in accordance with some embodiments, comprises generating QoS tokens within said wireless terminal at a rate which is a function of a QoS level, e.g., a QoS service level, associated with the wireless terminal and using a generated token to control access to a communications resource. An exemplary wireless terminal, in accordance with some embodiments, comprises: at least one processor configured to: generate QoS tokens within said wireless terminal at a rate which is a function of a QoS level, e.g., a QoS service level, associated with the wireless terminal and use a generated token to control access to a communications resource. The exemplary wireless terminal further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 5 is a drawing including an exemplary token generation rate table, an exemplary token lifetime table, and an exemplary maximum token accumulation table, in accordance with some embodiments.

FIG. 6 is a drawing illustrating exemplary QoS token generation and storage in an exemplary wireless terminal.

FIG. 7 is a drawing illustrating exemplary token replacement in accordance with some embodiments.

FIG. 8 is a table illustrating exemplary token allocation rules in accordance with various exemplary embodiments.

DETAILED DESCRIPTION

Figure 1:
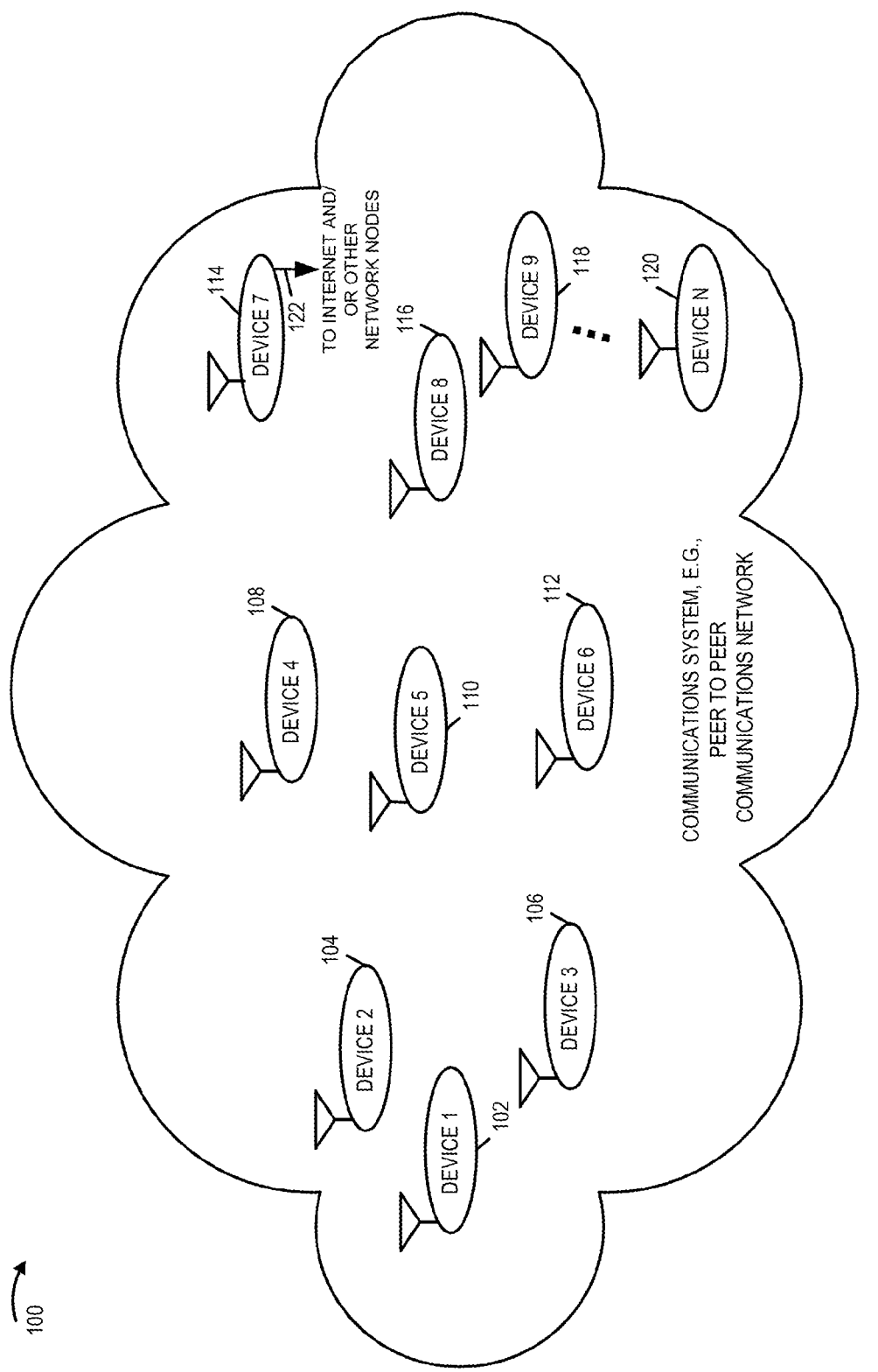
FIG. 1 is a drawing of an exemplary wireless communications system, e.g., peer to peer wireless communications system, in accordance with an exemplary embodiment.

FIG. 1 is a drawing of an exemplary wireless communication system 100, e.g., a peer to peer communications system in accordance with an exemplary embodiment. Exemplary wireless communications system 100 includes a plurality of wireless communications devices (device 1 102, device 2 104, device 3 106, device 4 108, device 5 110, device 6 112, device 7 114, device 8 116, device 9 118, . . . , device N 120. Some of the wireless communications devices in system 100, e.g., device 7 114, include an interface 122, to the Internet and/or other network nodes. Some of the wireless communications devices in system 100, e.g., device 1 102, device 2 104, device 3 106, device 4 108, device 5 110, device 6 112, device 8 116, device 9 118 and device N 120, are mobile wireless terminals, e.g., handheld mobile devices.

A wireless communications device within system 100 generates QoS tokens within the wireless terminal at a rate which is a function of a QoS level, e.g., a QoS service level, associated with the wireless terminal. The wireless terminal then uses a generated QoS token to control access to a communications resource. Different wireless terminals in system 100 may, and sometimes do, generate QoS tokens at different rates. The same wireless terminal may, and sometimes does, generate QoS tokens at different rates at different times, e.g., due to a change in its QoS level. In some embodiments, there are different types of QoS tokens, e.g., persistent and non-persistent QoS tokens. In some embodiments, a wireless terminal can store up to a predetermined maximum number of QoS tokens. In various embodiments, each of the QoS tokens has an individual lifetime.

Figure 2:
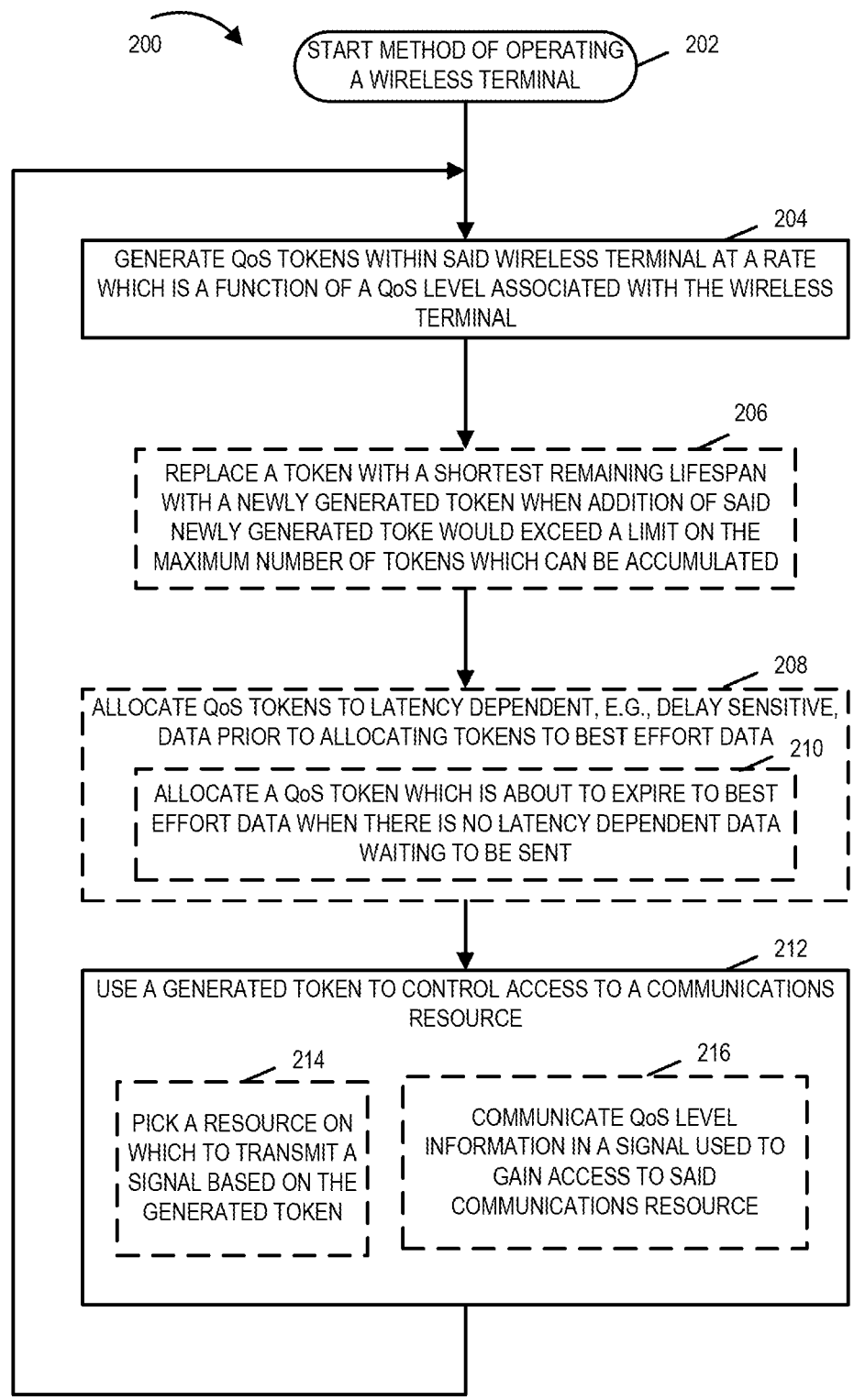
FIG. 2 is a flowchart of an exemplary method of operating a wireless terminal in accordance with an exemplary embodiment.

FIG. 2 is a flowchart 200 of an exemplary method of operating a wireless terminal in accordance with an exemplary embodiment. The wireless communications device implementing the method of flowchart 200 is, e.g., any of the wireless communications devices of system 100 of FIG. 1. Operation starts in step 202, where the wireless terminal is powered on and initialized. Operation proceeds from start step 202 to step 204.

In step 204, the wireless terminal generates QoS (Quality of Service) tokens within said wireless terminal at a rate which is a function of a QoS level, e.g., a QoS service level, associated with the wireless terminal. In some embodiments, e.g., some embodiments in which the wireless terminal is subject to a limit of a maximum number of tokens which can be accumulated, step 206 is included and performed. In step 206, the wireless terminal replaces a token with a shortest remaining lifespan when addition of said newly generated token would exceed a limit on the maximum number of tokens which can be accumulated by the wireless terminal.

In some embodiments, operation proceeds from step 204 or step 206 to step 208. In other embodiments, operation proceeds from step 204 or step 206 to step 212. In some embodiments including step 208, QoS tokens are shared by a plurality of applications on said wireless terminal, and, at times, one of said applications has latency dependent, e.g., delay sensitive, data to communicate and another one of said applications has best effort data to communicate. In various embodiments, the latency dependent data to communicate is latency dependent traffic data, e.g., latency dependent peer to peer traffic data, and the best effort data to communicate is best effort traffic data, e.g., best effort peer to peer traffic data. In step 208 the wireless terminal allocates QoS tokens to latency dependent data prior to allocating token to best effort data. In some embodiments, step 208 may, and sometimes does, include step 210. In step 210 the wireless terminal allocates a QoS token which is about to expire to best effort data when there is no latency dependent data waiting to be sent. Operation proceeds from step 208 to step 212.

In step 212 the wireless terminal uses a generated token to control access to a communications resource. In some embodiments, the communications resource is an air link resource, e.g., a segment such as a traffic segment or a request segment. In some embodiment, the request segment is a peer to peer traffic request segment. In some embodiments, the traffic segment is a peer to peer traffic segment. In various embodiments, the communications resource includes at least one of time, frequency, phase, power, and amplitude of transmission. In various embodiments, the communications resource includes at least two of time, frequency, phase, power, and amplitude of transmission. In some embodiments, the communications resource is a communications channel. In some embodiments, the communications resource is a portion of a communications channel.

In some embodiments, step 212 includes one or more of steps 214 and step 216. In step 214 the wireless terminal picks a resource on which to transmit a signal based on the generated token. In some embodiments, the resource is a frequency/time resource on which a peer to peer traffic request signal is sent. In step 216 the wireless terminal communicates QoS level information, e.g., QoS service level information, in a signal used to gain access to said communications resource. In some embodiments, the signal communicating the QoS level information is a WiFi request to send signal. In some embodiments, the signal communicating the QoS level information is a peer to peer traffic request signal. Operation proceeds from step 212 to step 204.

In various embodiments, QoS tokens include tokens of a plurality of different types, said plurality of different types includes a first type and a second type. In some such embodiments, the first token type is a persistent token type and the second token type is a non-persistent token type. In some embodiments, a generated token which is a persistent token expires when access to said communications resource is obtained. In some embodiments, a generated token which is a non-persistent token expires when the token is used to control access to a communications resource. With the non-persistent token, the token expires after it is used once, even though access to the communications resource may not actually be obtained.

In various embodiments, in which the wireless terminal generates both persistent and non-persistent tokens, more non-persistent tokens are generated in a time period than persistent tokens are generated in the same time period.

In some embodiments, there is a maximum finite number of tokens that can be stored by a wireless terminal and individual tokens have lifetimes. In various embodiments, there are a plurality of QoS levels, e.g., a gold level, a silver level, and a bronze service levels, with different QoS token generation rates associated with the different levels. In some embodiments, some users don't get any persistent tokens. For example, in some embodiments, a low level user, e.g., a bronze level user, gets only non-persistent tokens.

In some embodiments, different types of tokens may and often do have different lifespans. In some embodiments, different limits exist in terms of the maximum number of accumulated tokens in a wireless terminal for different types of tokens. A persistent token, in some embodiments, has a longer lifespan than a non-persistent token. This can, and sometimes does have the effect of preventing the accumulation of too many persistent tokens by a wireless terminal.

Figure 3:
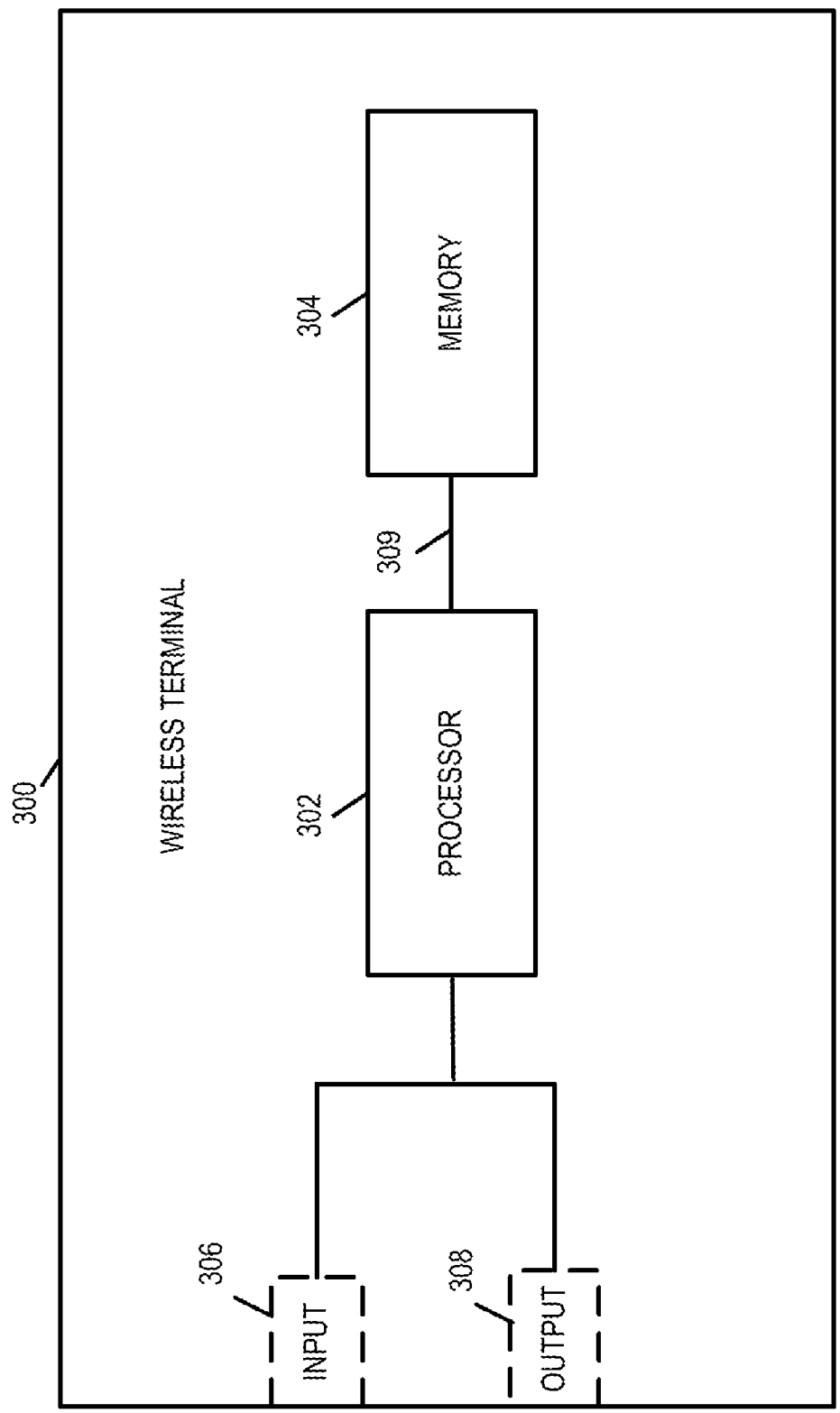
FIG. 3 is an exemplary wireless terminal in accordance with an exemplary embodiment.

FIG. 3 is a drawing of an exemplary wireless terminal 300, in accordance with an exemplary embodiment. Exemplary wireless terminal 300 is, e.g., one of the wireless communications devices of FIG. 1. Exemplary wireless communications device 300 may, and sometimes does, implement a method in accordance with flowchart 200 of FIG. 2.

Wireless terminal 300 includes a processor 302 and memory 304 coupled together via a bus 309 over which the various elements (302, 304) may interchange data and information. Wireless terminal 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to generate QoS tokens within said wireless terminal at a rate which is a function of a QoS level, e.g., a QoS service level, associated with the wireless terminal and use a generated token to control access to a communications resource. In various embodiments, processor 302 is further configured to perform at least one of:
picking a resource on which to transmit a signal based on said generated token; and
communicating QoS level information in a signal used to gain access to said communications resource, as part of being configured to use a generated token to control access to a communications resource. In some embodiments the resource which is picked is a frequency and/or time resource on which a peer to peer traffic request signal is sent. In some embodiments the signal communicating QoS information is a WiFi request to send signal. In some embodiments the signal communicating QoS information is a peer to peer traffic request signal.

In some embodiments QoS tokens are shared by a plurality of applications on said wireless terminal, and one of said applications may and sometimes does, have latency dependent, e.g., delay sensitive, data to communicate and another one of said applications may, and sometimes does, have best effort data to communicate. In some such embodiments, processor 302 is further configured to:
allocate QoS tokens to latency dependent data prior to allocating QoS tokens to best effort data. In various embodiments, processor 302 is further configured to allocate a QoS token which is about to expire to best effort data when there is no latency dependent data waiting to be sent, as part of being configured to allocate QoS tokens.

In some embodiments, QoS tokens include tokens of a plurality of different types, and said plurality of different types includes a first type and a second type, said first type being a persistent token type and said second type being a non-persistent token type. In some embodiments, a generated token which is a persistent token expires when access to said communications resource is obtained. In some embodiments, a generated token which is a non-persistent token expires when the token is used to control access to said communications resource, even though access may not actually be obtained. In various embodiments, processor 302 is further configured to generate more non-persistent tokens than persistent tokens in a time period, as part of being configured to generate QoS tokens. In some embodiments, processor 302 is configured such that there is a predetermined finite number tokens which can be stored. In various embodiments, processor 302 is configured to track remaining lifetime on an individual token basis. In some embodiments, processor 302 is configured to support multiple QoS levels, e.g., gold, silver, and bronze levels and is configured to implement different QoS token generation rates corresponding to the different levels. In some embodiments, processor 302 is further configured to deny persistent tokens to some service levels. For instance, in some embodiments, processor 302 generates only non-persistent tokens for a user having a low service level but does not generate any persistent tokens. In some embodiments, processor 302 is configured such that persistent tokens have longer lifespans than non-persistent tokens. Having lifespans associated with tokens can prevent over accumulation of tokens by a wireless terminal. Different types of tokens may and often do have different lifespans. In some embodiments, different limits exist in terms of max number of tokens that can be accumulated corresponding to the different types of tokens. For example, in some embodiments, a first number of persistent tokens may be accumulated and a second number of non-persistent tokens may be accumulated by a wireless terminal, wherein the first and second numbers are different predetermined numbers. In some embodiments there may be a limit on the total number of tokens that can be accumulated irrespective of the type. For example when all the tokens are stored in a common buffer of finite capacity. In some embodiments there could be combination of limits on maximum number of tokens that can be accumulated of individual type and maximum number of tokens that can be accumulated of a group of types of tokens.

In some embodiments wireless terminal 300, is subject to a limit of a maximum number of tokens which can be accumulated, and processor 302 is further configured to replace a token with a shortest remaining lifespan with a newly generated token when addition of said newly generated token would exceed said limit on token accumulation. In various embodiments, including different types of tokens, token replacement operations are performed independently for each type of token.

Figure 4:
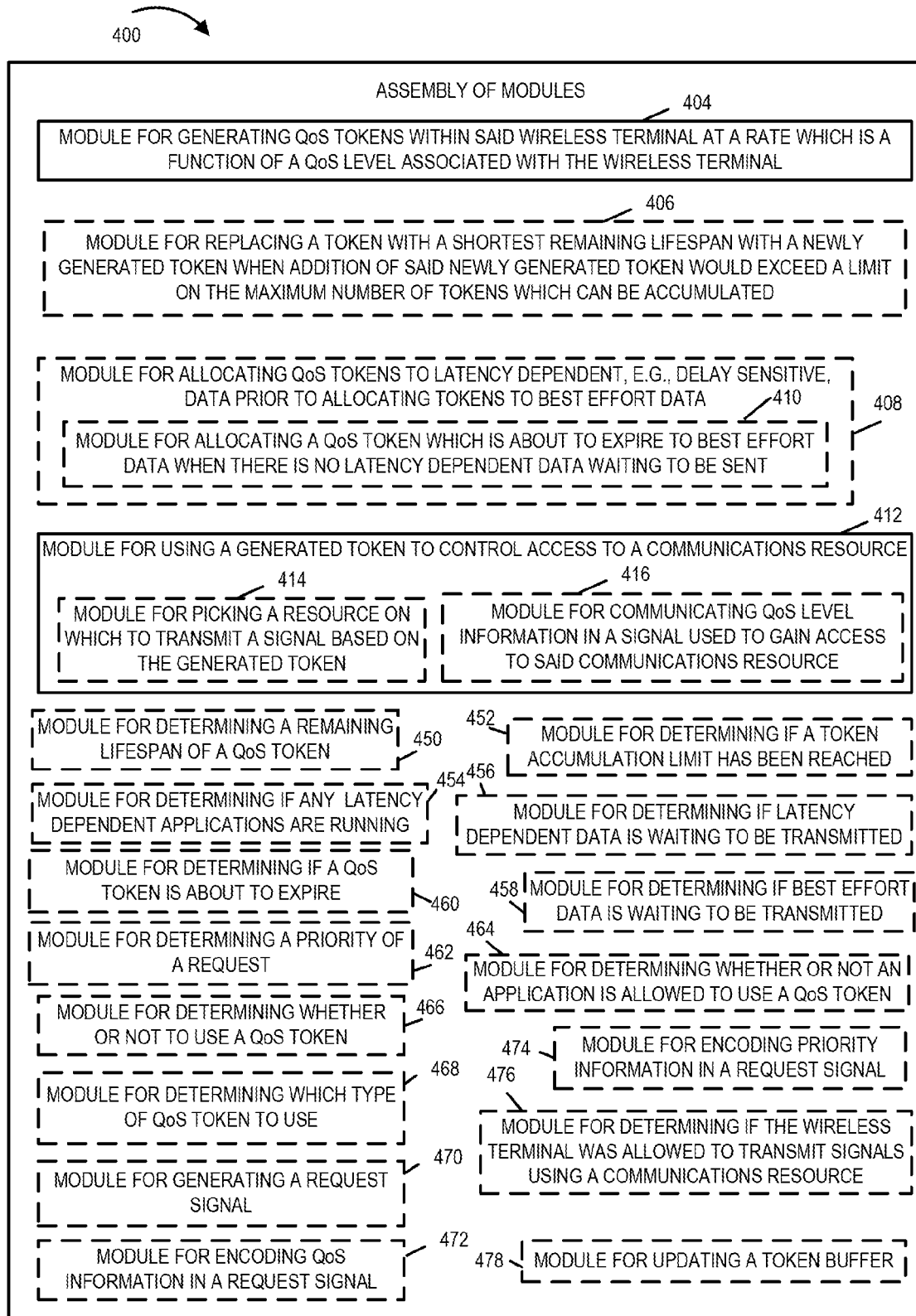
FIG. 4 is an assembly of modules which may be used in the exemplary wireless terminal of FIG. 3.

FIG. 4 is an assembly of modules 400 which can, and in some embodiments is, used in the wireless terminal 300 illustrated in FIG. 3. The modules in the assembly 400 can be implemented in hardware within the processor 302 of FIG. 3, e.g., as individual circuits. Alternatively, the modules may be implemented in software and stored in the memory 304 of the wireless terminal 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless terminal 300 or elements therein such as the processor 302, to perform the functions of the corresponding steps illustrated and/or described in the method of flowchart 200 of FIG. 2.

Assembly of modules 400 includes a module 404 for generating QoS tokens within said wireless terminal at a rate which is a function of a QoS level, e.g., a QoS service level, associated with the wireless terminal and a module 412 for using a generated token to control access to a communications resource. In various embodiments, assembly of modules 400 includes a module 406 for replacing a token with a shortest remaining lifespan with a newly generated token when addition of the newly generated token would exceed a limit on the maximum number of tokens which can be accumulated. In some embodiments, assembly of modules 400 further includes a module 408 for allocating QoS tokens to latency dependent, e.g., delay sensitive, data prior to allocating QoS token to best effort data.

Module 408, in some embodiments, includes a module for allocating a QoS token which is about to expire to best effort data when there is no latency dependent data waiting to be sent. Module 412, in various embodiments, includes one or more of: a module 414 for picking a resource on which to transmit a signal based on the generated token and a module 416 for communicating QoS level information in a signal used to gain access to said communications resource.

In some embodiments, QoS tokens generated by module 404 include tokens of a plurality of different types, said plurality of different types including a first type and a second type, said first type being a persistent token type and said second type being a non-persistent token type. In some embodiments, a generated token which is a persistent token expires when access to said communications resource is obtained. In some embodiments, a generated token which is a non-persistent token expires when the token is used to control access to said communications resource, even though access may not actually be obtained. For example, a non-persistent token may expire when a wireless terminal uses the non-persistent token to be able to send a high priority request to use a peer to peer traffic segment, even though the request may not be granted. In some embodiments, module 204 generates more non-persistent tokens in a time period than persistent tokens are generated in the same time period.

In some embodiments, assembly of modules 400 includes one or more of: a module 450 for determining a remaining lifespan of a QoS token, a module 452 for determining if a token accumulation limit has been reached, a module 454 for determining if any latency dependent applications are running, a module 456 for determining if latency dependent data is waiting to be transmitted, a module 458 for determining if best effort data is waiting to be transmitted, a module 460 for determining if a QoS token is about to expire, a module 462 for determining a priority of a request, a module 464 for determining whether or not an application is allowed to use a QoS token, a module 466 for determining whether or not to use a QoS token, a module 468 for determining which type of QoS token to use, a module 470 for generating a request signal, a module 472 for encoding QoS information in a request signal, a module 474 for encoding priority information in a request signal, a module 476 for determining if the wireless terminal was allowed to transmit signals using a communications resource, e.g. was allowed to transmit traffic signals in a traffic segment, and a module 478 for updating a token buffer, e.g., a token bucket. In some embodiments, the request signal is a traffic request signal, e.g., a peer to peer traffic request signal. In various embodiments, the different types of tokens include persistent type tokens and non-persistent type tokens. In some embodiments, the traffic signals are peer to peer traffic signals and the traffic segment is a peer to peer traffic segment.

FIG. 5 is a drawing 500 including an exemplary token generation rate table 502, an exemplary token lifetime table 504, and an exemplary maximum token accumulation table 506, in accordance with some embodiments. The tables of drawing 500 are, e.g., included as part of memory 304 of wireless terminal 300 and used to implement a method, e.g., in accordance with flowchart 200 of FIG. 2. Table 502 illustrates exemplary token generation rates corresponding to a plurality of QoS service levels for two different types of tokens. In this example, there are three different QoS service levels: a first level, e.g., gold level, a second level, e.g., silver level, and a third level, e.g., bronze level. The first level, e.g., gold level, is the highest QoS service level; the second level, e.g., silver level, is an intermediate QoS service level; and the third level, e.g., bronze level, is the lowest QoS service level. In this example, there are two different types of QoS tokens: first type tokens, e.g., persistent tokens, and second type tokens, e.g., non-persistent tokens. Corresponding to the first QoS service level, the token generation rate for first type tokens is rate 1A, e.g., 2 tokens/sec. Corresponding to the first QoS service level, the token generation rate for second type tokens is rate 1B, e.g., 20 tokens/sec. Corresponding to the second QoS service level, the token generation rate for first type tokens is rate 2A, e.g. 1 tokens/sec. Corresponding to the second QoS service level, the token generation rate for second type tokens is rate 2B, e.g., 10 tokens/sec. Corresponding to the third QoS service level, the token generation rate for first type tokens is rate 3A, e.g., 0 tokens/sec. Corresponding to the third QoS service level, the token generation rate for second type tokens is rate 3B, e.g., 5 tokens/sec.

Table 504 illustrates exemplary individual token lifetimes for the different type tokens. First type QoS tokens, e.g., persistent type tokens, have lifetime length A, e.g., 5 seconds. Second type QoS tokens, e.g., non-persistent type tokens, have lifetime length B, e.g., 20 seconds.

Table 506 illustrates exemplary maximum allowable limits on the amount of tokens a wireless terminal is allowed to accumulate for different types of tokens. In this example, a wireless terminal is allowed to accumulate max number A, e.g., 4, first type, e.g., persistent type, QoS tokens. In this example, a wireless terminal is allowed to accumulate max number B, e.g., 40, second type, e.g. non-persistent type, QoS tokens.

FIG. 6 is a drawing 600 illustrating exemplary QoS token generation and storage in an exemplary wireless terminal. Wireless terminal QoS token generation module 602 generates and outputs QoS tokens 608 as a function of QoS service level input 606 and service level to token generation rate mapping information 604. Service level to token generation mapping information 604 is, e.g., table 502 of FIG. 5. The service level to token generation mapping information 604 in some embodiments, is included as part of module 602. In some other embodiments the service level to token generation mapping information is stored externally to module 602 in memory and used by module 602. In some embodiments WT QoS token generation module 602 is module 404 of assembly of modules 400 of FIG. 4. In some embodiments, generated tokens have individual lifetimes, e.g., in accordance with table 504 of FIG. 5.

In this example, the generated tokens 608 which are output from module 602 include generated type 1 tokens 610, e.g., persistent type tokens, and generated type 2 tokens 612, e.g., non-persistent type tokens. The generated tokens are stored, as indicated by arrow 616, in a wireless terminal token bucket 614, e.g., a buffer of a predetermined size in memory 304 of wireless terminal 300. In this example, the WT token bucket 614 includes a wireless terminal type 1 token bucket 618 and a wireless terminal type 2 token bucket 620. In this example the wireless terminal is restricted in regards to the maximum number of tokens it is allowed to accumulate. Wireless terminal type 1 token bucket 618 which holds type 1 tokens can hold a maximum number of type 1 tokens as indicated by max number A 622. Wireless terminal type 2 token bucket 620 which holds type 2 tokens can hold a maximum number of type 2 tokens as indicated by max number B 624. The maximum number of tokens the wireless terminal is allowed to accumulate is, e.g., in accordance with table 506 of FIG. 5.

FIG. 7 is a drawing 700 illustrating exemplary token replacement in accordance with some embodiments. In this example, the token bucket 702 has maximum allowable token level 704, which has been reached by the inclusion of tokens (token 1 706, token 2 708, token 3 710, . . . , token N 712). Each generated token (706, 708, 710, . . . , 712) has an associated token generation time which is also stored (t1, t2, t3, . . . , tn). In some embodiments, a countdown timer is stored with each generated token which starts counting down, e.g., and the stored information represents remaining time in the lifespan of the token. Consider that the tokens (706, 708, 710, . . . , 712) were generated at different times but with same lifespans.

In this example token 1 706 is the oldest token in the token bucket 702, and token 1 706 has the shortest remaining lifespan of the tokens in token bucket 702 at the time token 714 is generated. Newly generated token 714 with token generation time $t_{new}$ enters the token bucket 702 as indicated by arrow 716. This newly generated token replaces the token with the shortest remaining lifespan, which in this case is token 1 706. The removal of unused token 1 706 from token bucket 702 is indicated by arrow 718. Token bucket 702 is, e.g., one of wireless terminal type 1 token bucket 618 and wireless terminal type 2 token bucket 620 of FIG. 6.

FIG. 8 is a table 800 illustrating exemplary token allocation rules in accordance with various exemplary embodiments. The token allocation rules are, e.g., stored in memory 304 of wireless terminal 300 and used by module 408 of assembly of modules 400 when implementing a method in accordance with flowchart 200 of FIG. 2. Row 802 indicates that if the conditions indicate that an application in the wireless terminal has latency dependent, e.g., delay sensitive, data waiting to be communicated, then the wireless terminal may, and sometimes does, allocate a QoS token to an application with latency dependent data waiting to be communicated. Row 804 indicates that if the conditions indicate that no latency dependent applications are running in the wireless terminal, then the wireless terminal may, and sometimes does, allocate a token to an application with best effort data waiting to be communicated. Row 806 indicates that if the conditions indicate that one or more latency dependent applications are running but have no latency dependent data waiting to be communicated and a token is about to expire, then the wireless terminal may, and sometimes does, allocate a token to an application with best effort data waiting to be communicated.

Figure 9:
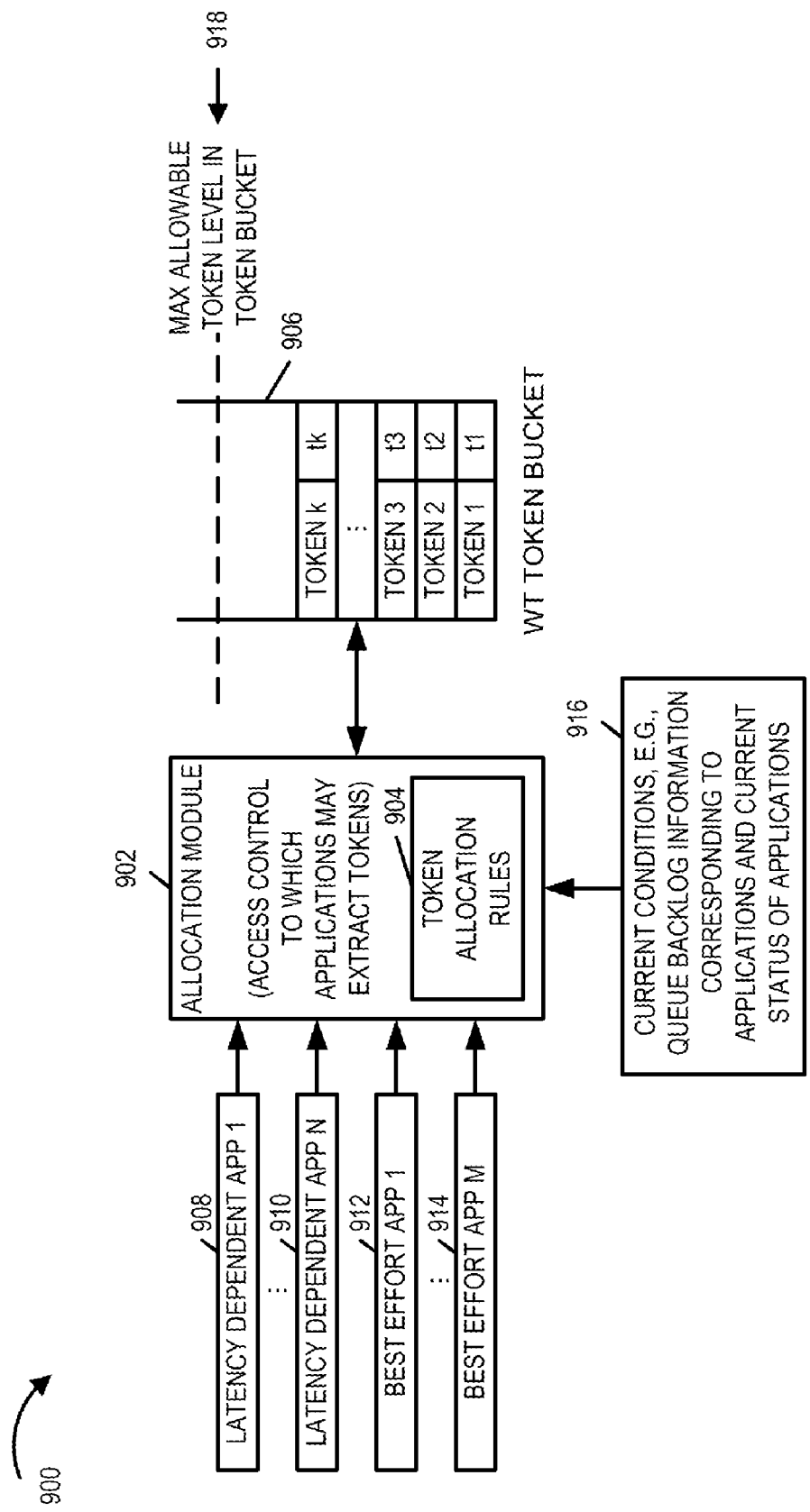
FIG. 9 is a drawing illustrating an exemplary embodiment in which stored QoS tokens in a wireless terminal may be, and sometimes are, allocated to different applications, e.g., in accordance with predetermined token allocation rules.

FIG. 9 is a drawing 900 illustrating an exemplary embodiment in which stored QoS tokens in a wireless terminal may be, and sometimes are, allocated to different applications, e.g., in accordance with predetermined token allocation rules. Exemplary applications include latency dependent applications (latency dependent application 1 908, . . . , latency dependent application N 910) and best effort applications (best effort application 1 912, . . . , best effort application M 914).

Allocation module 902 allocates QoS tokens from wireless terminal token bucket 906 as a function of token allocation rules 904 and current conditions 916. Allocation module 902 controls access to WT token bucket 906, e.g., deciding which applications may extract tokens from token bucket 906. Token allocation rules 904 are, e.g., information included in table 800 of FIG. 8. The token allocation rules 904, in some embodiments, are included as part of module 902. In some embodiments, the token allocation rules are stored in memory, e.g., memory 304 of wireless terminal 300 of FIG. 3 and accessed and used by allocation module 902. Allocation module 902 is, e.g., module 408 of assembly of modules 400 of FIG. 4. Token bucket 906 includes a plurality of tokens (token 1, token 2, token 3, . . . token k). Time information (t1, t2, t3, . . . , tk) is also stored and/or maintained corresponding to each token (token 1, token 2, token 3, . . . , token k). The time information includes, e.g., time a token was generated, lifetime associated with a token, and/or remaining lifetime of a token. The token bucket 906 also has a maximum allowable token level 918 corresponding to the maximum number of tokens which may accumulated by the wireless terminal. Exemplary token bucket 906 is, e.g., one of token bucket 614, token bucket 618 and token bucket 620 of FIG. 6. Current conditions 916 include, e.g., queue backlog information corresponding to the various applications and the current status of the applications.

Figure 10:
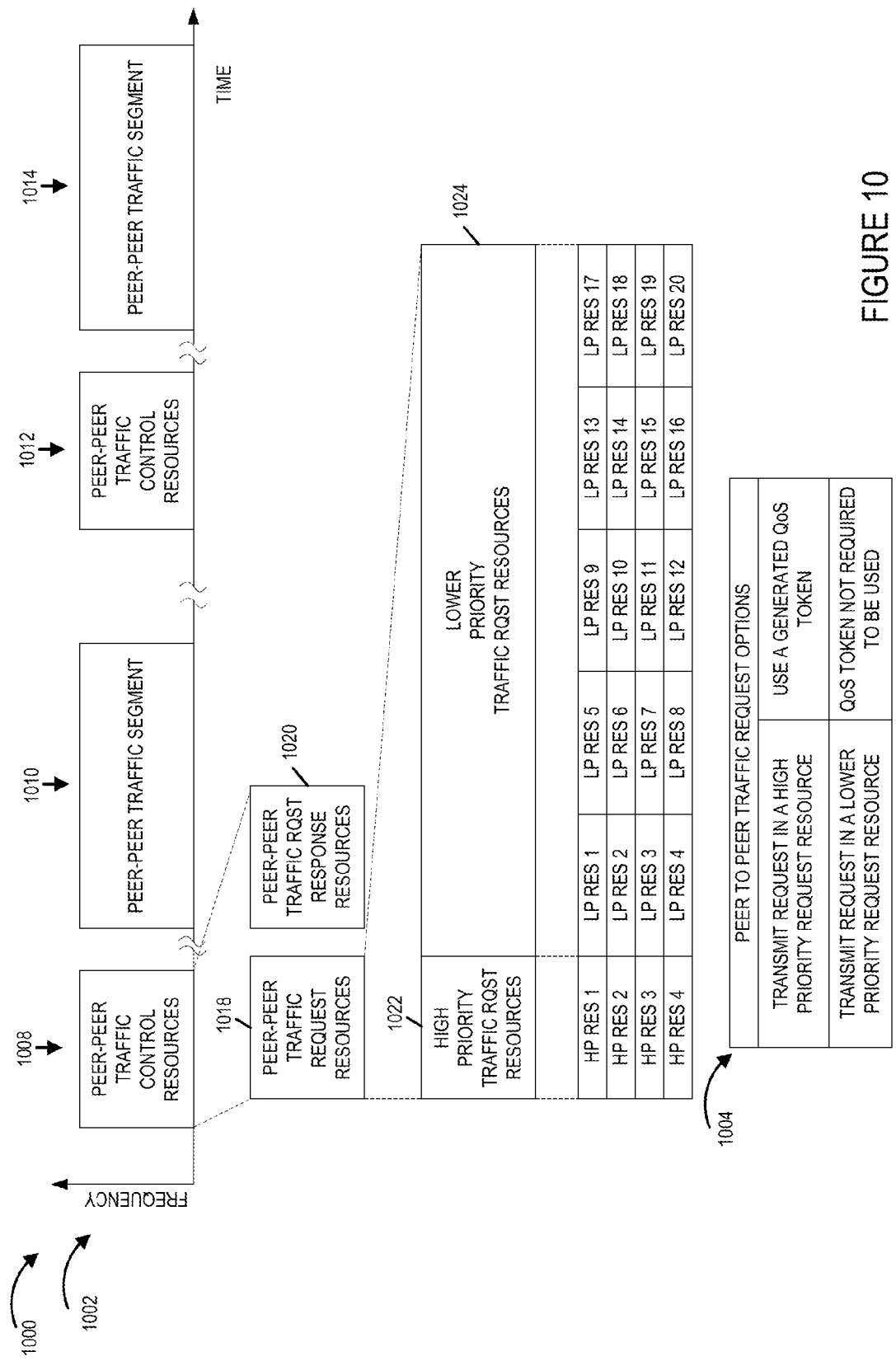
FIG. 10 is a drawing including an exemplary peer to peer recurring timing-frequency structure and an exemplary peer to peer traffic request options table in accordance with an exemplary embodiment.

FIG. 10 is a drawing 1000 including an exemplary peer to peer recurring timing-frequency structure 1002 and an exemplary peer to peer traffic request options table 1004 in accordance with an exemplary embodiment. The exemplary peer to peer timing structure includes a plurality of peer to peer traffic control resources and a plurality of corresponding peer to peer traffic segments ((peer to peer traffic control resources 1008, peer to peer traffic segment 1010), . . . , (peer to peer traffic control resources 1012, peer to peer traffic segment 1014)). Peer to peer traffic control resources 1008 includes peer to peer traffic request resources 1018 and peer to peer traffic request response resources 1020. The peer to peer traffic request resources include high priority traffic request resources 1022 and lower priority traffic request resources 1024. The high priority traffic request resources 1022 include high priority request resource 1, high priority request resource 2, high priority request resource 3 and high priority request resource 4. The lower priority request resources 1024 include low priority request resource 1, low priority request resource 2, low priority request resource 3, low priority request resource 4, low priority request resource 5, low priority request resource 6, low priority request resource 7, low priority request resource 8, low priority request resource 9, low priority request resource 10, low priority request resource 11, low priority request resource 12, low priority request resource 13, low priority request resource 14, low priority request resource 15, low priority request resource 16, low priority request resource 17, low priority request resource 18, low priority request resource 19, and low priority request resource 20.

Peer to peer traffic requests options table 1004 indicates that for a wireless terminal to transmit a peer to peer traffic transmission request in a high priority traffic request resource the wireless terminal uses one of its generated QoS tokens. Peer to peer traffic requests options table 1004 further indicates that a wireless terminal can transmit a peer to peer traffic transmission request in a lower priority traffic transmission request resource and a QoS token is not required to be used.

Figure 11:
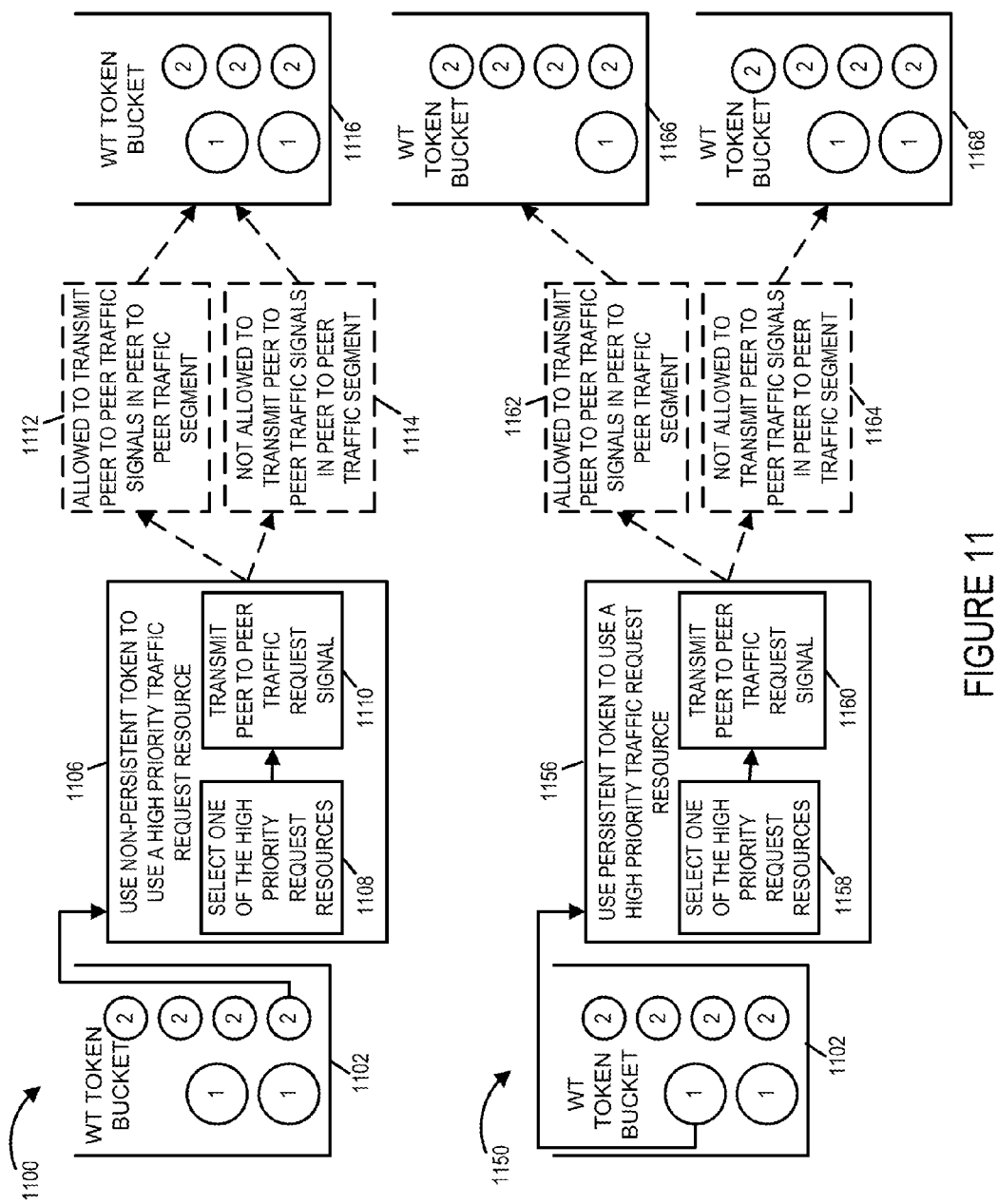
FIG. 11 includes a drawing illustrating a scenario in which a wireless terminal uses a non-persistent token to use a high priority traffic request resource and a drawing in which the wireless terminal uses a persistent token to use a high priority traffic request resource.

FIG. 11 include a drawing 1100 illustrating a scenario in which a wireless terminal uses a non-persistent token to use a high priority traffic request resource and a drawing 1150 in which the wireless terminal uses a persistent token to use a high priority traffic request resource. The exemplary wireless terminal implementing the method described in FIG. 11 may, e.g., use the timing frequency structure 1002 and peer to peer traffic request options table 1004 of FIG. 10.

With regard to drawing 1100, consider that an exemplary wireless terminal has token bucket 1102 with two type 1 QoS tokens, which are persistent tokens, and four type 2 tokens, which are non-persistent tokens. Further consider that the wireless terminal decides to use and uses a non-persistent token to use a high priority traffic request resource as indicated by box 1106. The wireless terminal selects one of the high priority request resources as indicated by box 1108, generates a peer to peer traffic request signal and transmits the generated peer to peer traffic request signal using the selected high priority request resource as indicated by box 1110. The wireless terminal may be allowed to transmit peer to peer traffic signals in the peer to peer traffic segment corresponding to the request resource as indicated by box 1112 or alternatively, the wireless terminal may not be allowed to transmit peer to peer traffic signals in the peer to peer traffic segment corresponding to the request resource. Under either scenario the wireless terminal loses the non-persistent token from its token bucket. The wireless terminal's bucket now includes 2 persistent tokens and 3 non-persistent tokens as indicated by bucket 1116.

With regard to drawing 1150, consider that an exemplary wireless terminal has token bucket 1102 with two type 1 QoS tokens, which are persistent tokens, and four type 2 tokens, which are non-persistent tokens. Further consider that the wireless terminal decides to use and uses a persistent token to use a high priority traffic request resource as indicated by box 1156. The wireless terminal selects one of the high priority request resources as indicated by box 1158, generates a peer to peer traffic request signal and transmits the generated peer to peer traffic request signal using the selected high priority request resource as indicated by box 1160. The wireless terminal may be allowed to transmit peer to peer traffic signals in the peer to peer traffic segment corresponding to the request resource as indicated by box 1162. If the wireless terminal is allowed to transmit peer to peer traffic signals, then the wireless terminal loses the persistent token and the token bucket now includes 1 persistent token and four non-persistent tokens as indicated by bucket 1166. Alternatively, the wireless terminal may not be allowed to transmit peer to peer traffic signals in the peer to peer traffic segment corresponding to the request resource as indicated by box 1164. If the wireless terminal is not allowed to transmit peer to peer traffic signals, then the wireless terminal does not lose the persistent token and the token bucket still includes 2 persistent token and four non-persistent tokens as indicated by bucket 1168.

Figure 12:
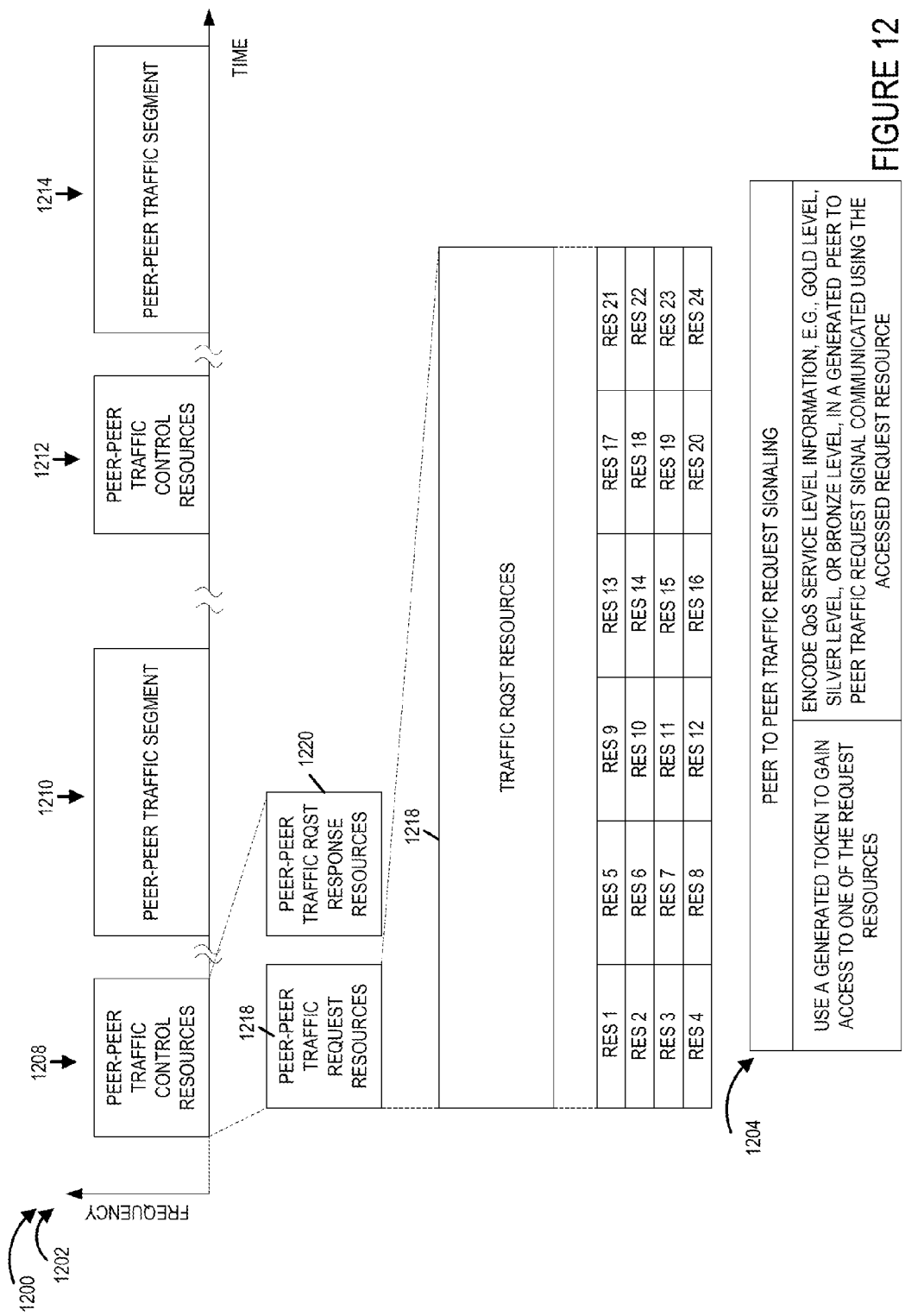
FIG. 12 is a drawing including an exemplary peer to peer recurring timing-frequency structure and an exemplary peer to peer traffic request signaling table in accordance with an exemplary embodiment.

FIG. 12 is a drawing 1200 including an exemplary peer to peer recurring timing-frequency structure 1202 and an exemplary peer to peer traffic request signaling table 1204 in accordance with an exemplary embodiment. The exemplary peer to peer timing structure 1202 includes a plurality of peer to peer traffic control resources and a plurality of corresponding peer to peer traffic segments ((peer to peer traffic control resources 1208, peer to peer traffic segment 1210), . . . , (peer to peer traffic control resources 1212, peer to peer traffic segment 1214)). Peer to peer traffic control resources 1208 include peer to peer traffic request resources 1218 and peer to peer traffic request response resources 1220. Peer to peer traffic request resources 1218 include traffic request resource 1, traffic request resource 2, traffic request resource 3, traffic request resource 4, traffic request resource 5, traffic request resource 6, traffic request resource 7, traffic request resource 8, traffic request resource 9, traffic request resource 10, traffic request resource 11, traffic request resource 12, traffic request resource 13, traffic request resource 14, traffic request resource 15, traffic request resource 16, traffic request resource 17, traffic request resource 18, traffic request resource 19, traffic request resource 20, traffic request resource 21, traffic request resource 22, traffic request resource 23 and traffic request resource 24.

Peer to peer traffic request signaling table 1204 indicates that a wireless terminal uses a generated QoS token to gain access to one of the traffic request resources and that the wireless terminal encodes QoS service level information in a generated peer to peer traffic request signal communicated using the accessed traffic request resource. The encoded QoS service level information is, e.g., one of a gold level, a silver level, and a bronze level.

Figure 13:
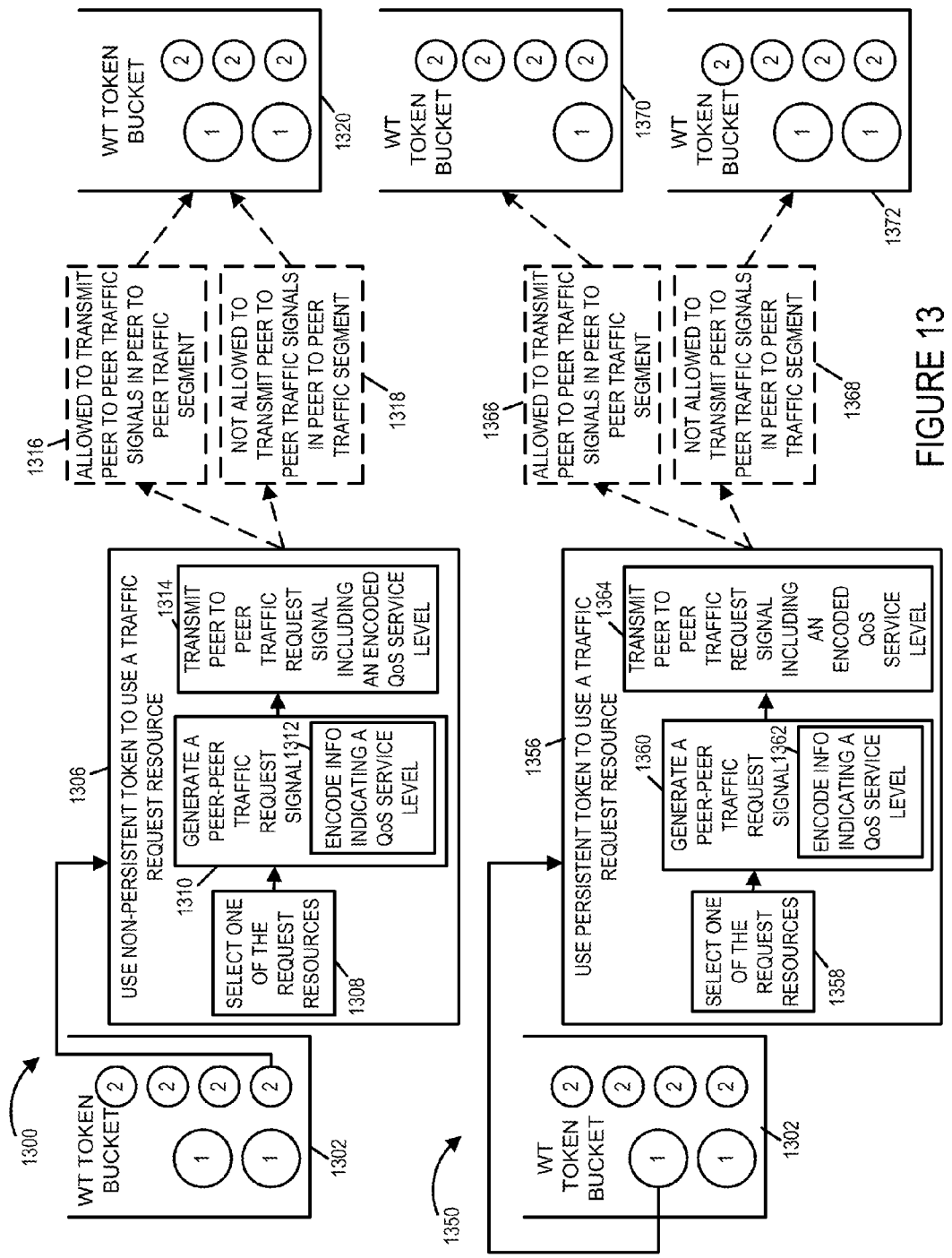
FIG. 13 includes a drawing illustrating a scenario in which a wireless terminal uses a non-persistent token to use a traffic request resource and a drawing in which the wireless terminal uses a persistent token to use a traffic request resource.

FIG. 13 includes a drawing 1300 illustrating a scenario in which a wireless terminal uses a non-persistent token to use a traffic request resource and a drawing 1350 in which the wireless terminal uses a persistent token to use a traffic request resource. The exemplary wireless terminal implementing the method described in FIG. 13 may, e.g., use the timing frequency structure 1202 and peer to peer traffic request signaling table 1204 of FIG. 12.

With regard to drawing 1300, consider that an exemplary wireless terminal has token bucket 1302 with two type 1 QoS tokens, which are persistent tokens, and four type 2 tokens, which are non-persistent tokens. Further consider that the wireless terminal decides to use and uses a non-persistent token to use a traffic request resource as indicated by box 1306. The wireless terminal selects one of the request resources as indicated by box 1308, generates a peer to peer traffic request signal including an encoded QoS service level as indicated by box 1310 including box 1312, and transmits the generated peer to peer traffic request signal including the encoded QoS service level using the selected request resource as indicated by box 1314. The wireless terminal may be allowed to transmit peer to peer traffic signals in the peer to peer traffic segment corresponding to the request resource as indicated by box 1316 or alternatively, the wireless terminal may not be allowed to transmit peer to peer traffic signals in the peer to peer traffic segment corresponding to the request resource as indicated by box 1318. Under either scenario the wireless terminal loses the non-persistent token from its token bucket. The wireless terminals bucket now includes 2 persistent tokens and 3 non-persistent tokens as indicated by bucket 1320.

With regard to drawing 1350, consider that an exemplary wireless terminal has token bucket 1302 with two type 1 QoS tokens, which are persistent tokens, and four type 2 tokens, which are non-persistent tokens. Further consider that the wireless terminal decides to use and uses a persistent token to use a traffic request resource as indicated by box 1356. The wireless terminal selects one of the request resources as indicated by box 1358, generates a peer to peer traffic request signal including an encoded QoS service level as indicted by box 1360 including box 1362, and transmits the generated peer to peer traffic request signal including the encoded QoS service level using the selected request resource as indicated by box 1364. The wireless terminal may be allowed to transmit peer to peer traffic signals in the peer to peer traffic segment corresponding to the request resource as indicated by box 1366. If the wireless terminal is allowed to transmit peer to peer traffic signals, then the wireless terminal loses the persistent token and the token bucket now includes 1 persistent token and four non-persistent tokens as indicated by bucket 1370. Alternatively, the wireless terminal may not be allowed to transmit peer to peer traffic signals in the peer to peer traffic segment corresponding to the request resource as indicated by box 1368. If the wireless terminal is not allowed to transmit peer to peer traffic signals, then the wireless terminal does not lose the persistent token and the token bucket still includes 2 persistent token and four non-persistent tokens as indicated by bucket 1372.

Figure 14:
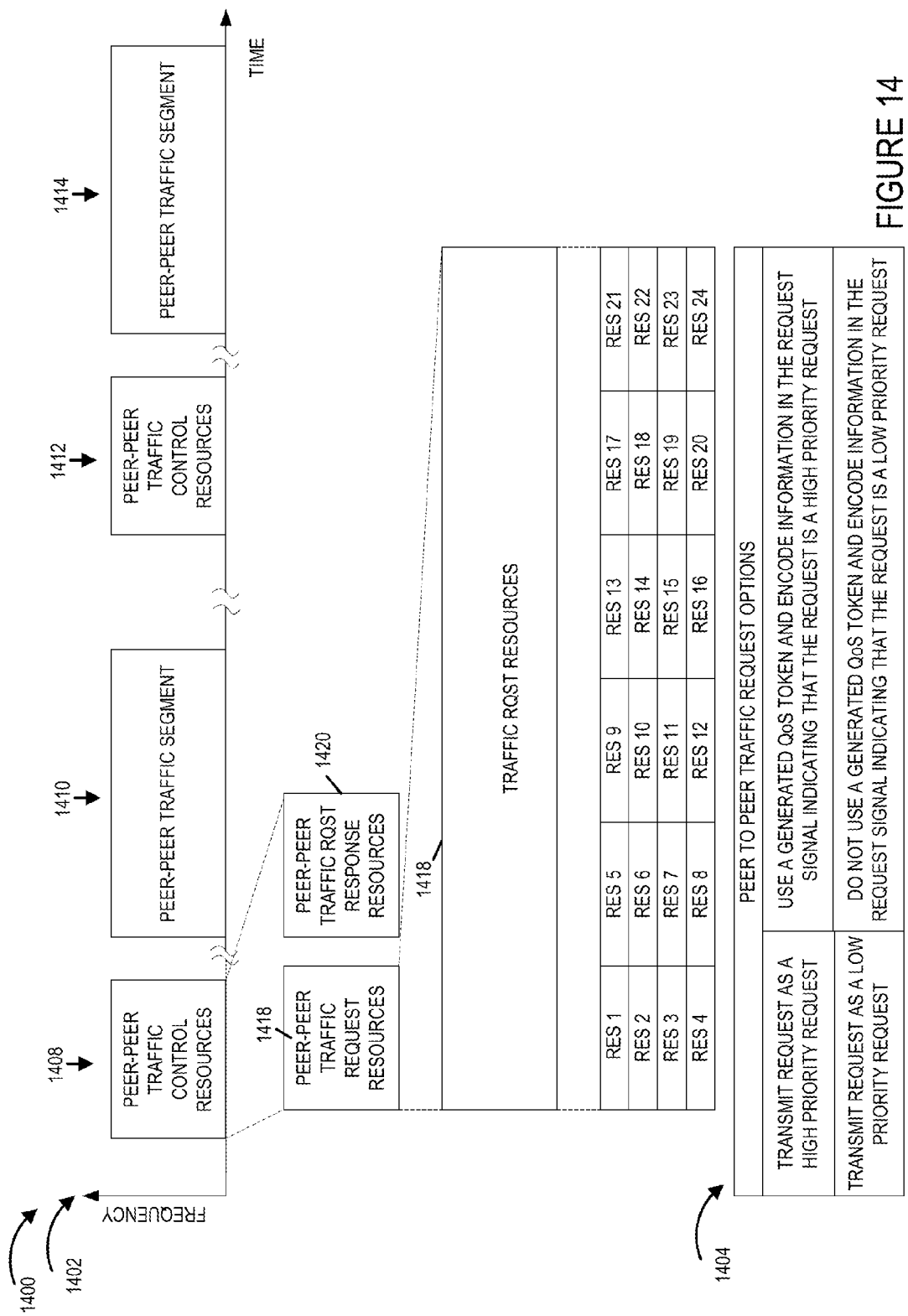
FIG. 14 is a drawing including an exemplary peer to peer recurring timing-frequency structure and an exemplary peer to peer traffic request options table in accordance with an exemplary embodiment.

FIG. 14 is a drawing 1400 including an exemplary peer to peer recurring timing-frequency structure 1402 and an exemplary peer to peer traffic request options table 1404 in accordance with an exemplary embodiment. The exemplary peer to peer timing structure 1402 includes a plurality of peer to peer traffic control resources and a plurality of corresponding peer to peer traffic segments ((peer to peer traffic control resources 1408, peer to peer traffic segment 1410), . . . , (peer to peer traffic control resources 1412, peer to peer traffic segment 1414)). Peer to peer traffic control resources 1408 include peer to peer traffic request resources 1418 and peer to peer traffic request response resources 1420. Peer to peer traffic request resources 1418 include traffic request resource 1, traffic request resource 2, traffic request resource 3, traffic request resource 4, traffic request resource 5, traffic request resource 6, traffic request resource 7, traffic request resource 8, traffic request resource 9, traffic request resource 10, traffic request resource 11, traffic request resource 12, traffic request resource 13, traffic request resource 14, traffic request resource 15, traffic request resource 16, traffic request resource 17, traffic request resource 18, traffic request resource 19, traffic request resource 20, traffic request resource 21, traffic request resource 22, traffic request resource 23 and traffic request resource 24.

Peer to peer traffic request options table 1404 indicates that if the wireless terminal wants to transmit a traffic request signal as a high priority request, then the wireless terminal uses a generated QoS token and encodes information in the traffic request signal indicating that the request is a high priority request. Peer to peer traffic request options table 1404 further indicates that if the wireless terminal wants to transmit a traffic request signal as a low priority request, then the wireless terminal does not use a generated QoS token and encodes information in the traffic request signal indicating that the request is a low priority request. In some embodiments, a single bit is used to convey whether the request is high priority or low priority, e.g., priority bit=1 signifies high priority and priority bit=0 signifies low priority.

In some other embodiments, more than two request levels are possible, e.g., with more than a single bit being used to convey the encoded priority level of the traffic request. For example, a low priority request uses no QoS tokens, a medium priority request uses 1 QoS token and a high priority request uses 2 QoS tokens.

Figure 15:
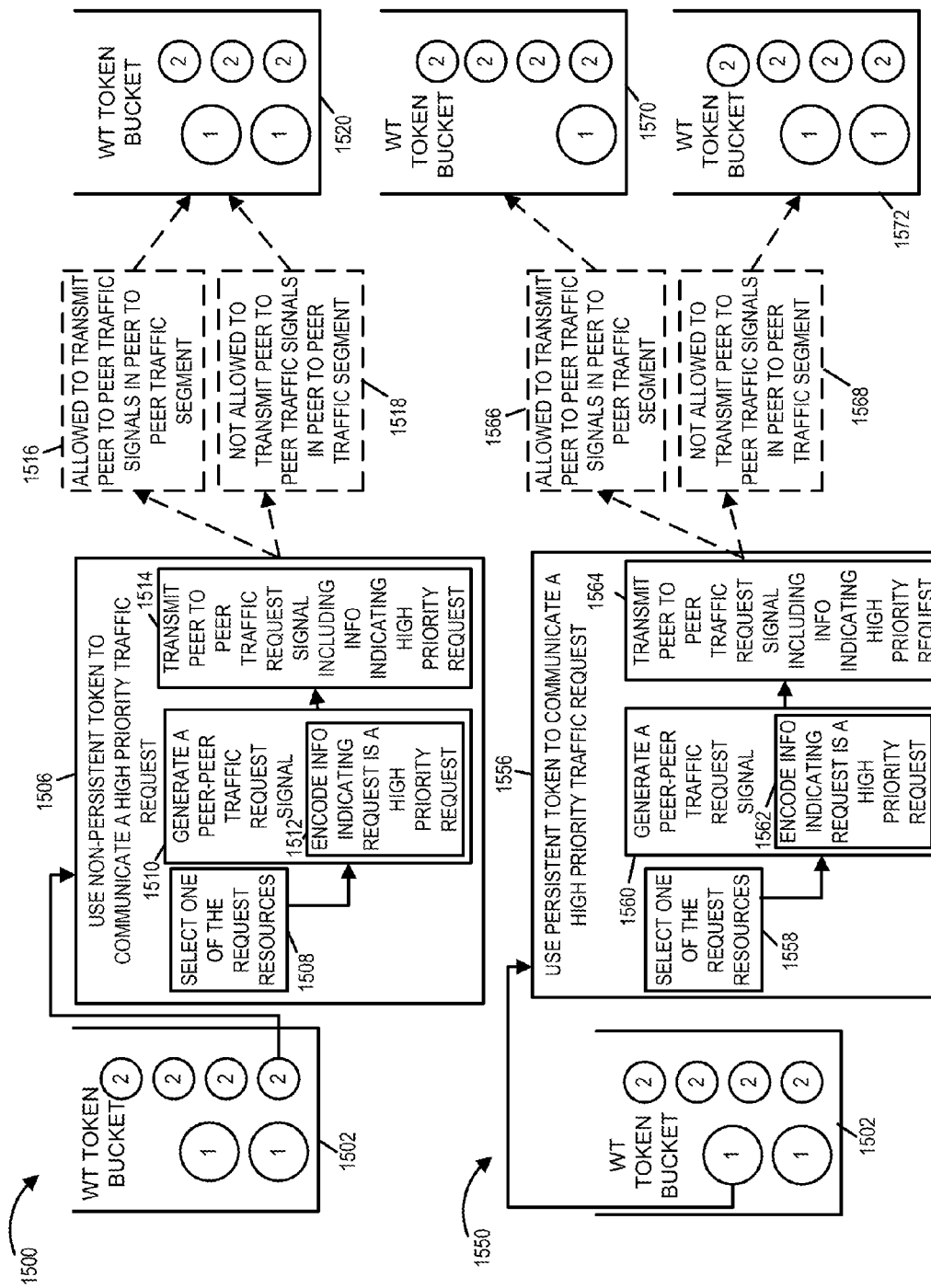
FIG. 15 includes a drawing illustrating a scenario in which a wireless terminal uses a non-persistent token to communicate a high priority traffic request and a drawing in which the wireless terminal uses a persistent token to communicate a high priority traffic request.

FIG. 15 includes a drawing 1500 illustrating a scenario in which a wireless terminal uses a non-persistent token to communicate a high priority traffic request and a drawing 1550 in which the wireless terminal uses a persistent token to communicate a high priority traffic request. The exemplary wireless terminal implementing the method described in FIG. 15 may, e.g., use the timing frequency structure 1402 and peer to peer traffic request signaling table 1404 of FIG. 14.

With regard to drawing 1500, consider that an exemplary wireless terminal has token bucket 1502 with two type 1 QoS tokens, which are persistent tokens, and four type 2 tokens, which are non-persistent tokens. Further consider that the wireless terminal decides to use and uses a non-persistent token to communicate a high priority traffic request as indicated by box 1506. The wireless terminal selects one of the request resources as indicated by box 1508, generates a peer to peer traffic request signal including encoded information indicating that the request is a high priority request as indicated by box 1510 including box 1512, and transmits the generated peer to peer traffic request signal including information indicating that the request is a high priority request using the selected request resource as indicated by box 1514. The wireless terminal may be allowed to transmit peer to peer traffic signals in the peer to peer traffic segment corresponding to the request resource as indicated by box 1516 or alternatively, the wireless terminal may not be allowed to transmit peer to peer traffic signals in the peer to peer traffic segment corresponding to the request resource as indicated by box 1518. Under either scenario the wireless terminal loses the non-persistent token from its token bucket. The wireless terminal's bucket now includes 2 persistent tokens and 3 non-persistent tokens as indicated by bucket 1520.

With regard to drawing 1550, consider that an exemplary wireless terminal has token bucket 1502 with two type 1 QoS tokens, which are persistent tokens, and four type 2 tokens, which are non-persistent tokens. Further consider that the wireless terminal decides to use and uses a persistent token to communicate a high priority traffic request as indicated by box 1556. The wireless terminal selects one of the request resources as indicated by box 1558, generates a peer to peer traffic request signal including encoded information indicating that the request is a high priority request as indicted by box 1560 including box 1562, and transmits the generated peer to peer traffic request signal including the encoded information indicating that the request is a high priority request using the selected request resource as indicated by box 1564. The wireless terminal may be allowed to transmit peer to peer traffic signals in the peer to peer traffic segment corresponding to the request resource as indicated by box 1566. If the wireless terminal is allowed to transmit peer to peer traffic signals, then the wireless terminal loses the persistent token and the token bucket now includes 1 persistent token and four non-persistent tokens as indicated by bucket 1570. Alternatively, the wireless terminal may not be allowed to transmit peer to peer traffic signals in the peer to peer traffic segment corresponding to the request resource as indicated by box 1568. If the wireless terminal is not allowed to transmit peer to peer traffic signals, then the wireless terminal does not lose the persistent token and the token bucket still includes 2 persistent token and four non-persistent tokens as indicated by bucket 1572.

In various embodiments a communications device, e.g., communications device 300 of FIG. 3, includes a module corresponding to each of the individual steps and/or operations described with regard to any of the Figures in the present application and/or described in the detailed description of the present applications. The modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

Various aspects and/or features of some embodiments, are described below. Consider an ad-hoc peer to peer wireless network, in which some of the user devices, e.g., some of the wireless terminals, are authorized to have certain types of QoS privileges. The use of QoS privileges is controlled by one or more or all of the items described the following exemplary mechanism.

1. The devices authorized for the QoS use tokens to assert the QoS privileges. A device can have QoS if it has a token to use QoS, but cannot have QoS if it does not have a token to use QoS. A token expires each time a device asserts QoS.
2. The tokens are generated in the device by the device at a certain rate. The rate of token generation can be, and sometimes is, a function of the type of QoS to which the device subscribes.
3. The tokens, in some embodiments, are stored in a buffer, e.g., a finite buffer, within the wireless terminal. The size of the buffer can be a function of the QoS type. At any given time, a device can have at most a finite number of tokens determined by the buffer size.
4. Each of the applications being run by the device share the QoS tokens from the same buffer.
5. The tokens, in some embodiments, have a limited life, i.e., a token is not valid after certain duration after it is generated. The life-time of the token can be, and sometimes is, a function of QoS type.
6. A token, in some embodiments, is one of a plurality of different types of tokens.

For example, a token, in some embodiments, is a persistent type token or a non persistent type token, e.g., based on the type of QoS. A non persistent token, in some embodiments, is one that allows the device to contend once for the medium access with QoS privileges and becomes invalid after the contention; irrespective of whether the device gets the access to the medium. On the other hand, a persistent token, in some embodiments, is valid until the device gets the access to the medium.

7. A device, in some embodiments, can, and sometimes does, destroy a QoS token without using it in order to accommodate a newly generated token.

In the above mechanism, the device, e.g., wireless terminal, controls which application or applications use its limited token budget. The finite buffer, token expiration time information and shared tokens among applications are advantageous in preventing a device with QoS from hogging resources. Applications have no or reduced incentive to assert QoS when unnecessary as it may prevent other applications running on the device from asserting QoS privileges. If a particular application is written in a malicious way, e.g., requesting for QoS all or most of the time, the device's user will see performance degradation of other applications and thus be inclined not to use that particular application that unnecessarily assets QoS.

In various embodiments a communications device, e.g., communications device 300 of FIG. 3, includes a module corresponding to each of the individual steps and/or operations described with regard to any of the Figures in the present application and/or described in the detailed description of the present applications. The modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium, e.g., a non-transitory machine readable medium, such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a wireless terminal, comprising:
generating QoS tokens within said wireless terminal at a rate which is a function of a QoS level associated with the wireless terminal, said wireless terminal being subjected to a limit of a maximum number of tokens which can be accumulated;
replacing a token with a shortest remaining life span with a newly generated token when addition of said newly generated token would exceed said limit on token accumulation; and
using a generated token to control access to a communications resource.

2. The method of claim 1, wherein using a generated token to control access to a communications resource includes at least one of:
picking a resource on which to transmit a signal based on said generated token; and
communicating QoS level information in a signal used to gain access to said communications resource.

3. The method of claim 1, wherein said QoS tokens are shared by a plurality of applications on said wireless terminal, one of said applications having latency dependent data to communicate and another one of said applications having best effort data to communicate, the method further comprising:
allocating QoS tokens to latency dependent data prior to allocating QoS tokens to best effort data.

4. A method of operating a wireless terminal, comprising:
generating QoS tokens within said wireless terminal at a rate which is a function of a QoS level associated with the wireless terminal, said QoS tokens being shared by a plurality of applications on said wireless terminal, one of said applications having latency dependent data to communicate and another one of said applications having best effort data to communicate;
allocating QoS tokens to latency dependent data prior to allocating QoS tokens to best effort data, allocating QoS tokens including:
allocating a QoS token which is about to expire to best effort data when there is no latency dependent data waiting to be sent; and
using a generated token to control access to a communications resource.

5. The method of claim 1, wherein said QoS tokens include tokens of a plurality of different types, said plurality of different types including a first type and a second type, said first type being a persistent token type and said second type being a non-persistent token type.

6. A method of operating a wireless terminal, comprising:
generating QoS tokens within said wireless terminal at a rate which is a function of a QoS level associated with the wireless terminal, said QoS tokens including tokens of a plurality of different types, said plurality of different types including a first type and a second type, said first type being a persistent token type and said second type being a non-persistent token type;
using a generated token to control access to a communications resource; and
wherein said generated token is a persistent token, said persistent token expiring when access to said communications resource is obtained.

7. The method of claim 5, wherein said generated token is a non-persistent token, said non-persistent token expiring when the token is used to control access to said communications resource.

8. The method of claim 5, wherein more non-persistent tokens are generated in a time period than persistent tokens are generated in the same time period.

9. A wireless terminal comprising:
means for generating QoS tokens within said wireless terminal at a rate which is a function of a QoS level associated with the wireless terminal, said wireless terminal being subjected to a limit of a maximum number of tokens which can be accumulated;
means for replacing a token with a shortest remaining life span with a newly generated token when addition of said newly generated token would exceed said limit on token accumulation; and means for using a generated token to control access to a communications resource.

10. The wireless terminal of claim 9, wherein said means for using a generated token to control access to a communications resource includes at least one of:
    means for picking a resource on which to transmit a signal based on said generated token; and
    means for communicating QoS level information in a signal used to gain access to said communications resource.

11. The wireless terminal of claim 9, wherein said QoS tokens are shared by a plurality of applications on said wireless terminal, one of said applications having latency dependent data to communicate and another one of said applications having best effort data to communicate, the wireless terminal further comprising:
    means for allocating QoS tokens to latency dependent data prior to allocating QoS tokens to best effort data.

12. The wireless terminal of claim 11, wherein said means for allocating tokens includes:
    means for allocating a QoS token which is about to expire to best effort data when there is no latency dependent data waiting to be sent.

13. The wireless terminal of claim 9, wherein said QoS tokens include tokens of a plurality of different types, said plurality of different types including a first type and a second type, said first type being a persistent token type and said second type being a non-persistent token type.

14. A computer program product for use in a wireless terminal, the computer program product comprising:
    a non-transitory computer readable medium comprising:
        code for causing at least one computer to generate QoS tokens within said wireless terminal at a rate which is a function of a QoS level associated with the wireless terminal, said wireless terminal being subjected to a limit of a maximum number of tokens which can be accumulated;
        code for causing said at least one computer to replace a token with a shortest remaining life span with a newly generated token when addition of said newly generated token would exceed said limit on token accumulation; and
        code for causing said at least one computer to use a generated token to control access to a communications resource.

15. A wireless terminal comprising:
    at least one processor configured to:
        generate QoS tokens within said wireless terminal at a rate which is a function of a QoS level associated with the wireless terminal, said wireless terminal being subjected to a limit of a maximum number of tokens which can be accumulated;
        replace a token with a shortest remaining life span with a newly generated token when addition of said newly generated token would exceed said limit on token accumulation; and
        use a generated token to control access to a communications resource; and
    memory coupled to said at least one processor.

16. The wireless terminal of claim 15, wherein said at least one processor is further configured to perform at least one of:
    picking a resource on which to transmit a signal based on said generated token; and
    communicating QoS level information in a signal used to gain access to said communications resource,
    as part of being configured to use a generated token to control access to a communications resource.

17. The wireless terminal of claim 15, wherein said QoS tokens are shared by a plurality of applications on said wireless terminal, one of said applications having latency dependent data to communicate and another one of said applications having best effort data to communicate, and
    wherein said at least one processor is further configured to:
    allocate QoS tokens to latency dependent data prior to allocating QoS tokens to best effort data.

18. The wireless terminal of claim 17, wherein said at least one processor is further configured to: allocate a QoS token which is about to expire to best effort data when there is no latency dependent data waiting to be sent, as part of being configured to allocate QoS tokens.

19. The wireless terminal of claim 15, wherein said QoS tokens include tokens of a plurality of different types, said plurality of different types including a first type and a second type, said first type being a persistent token type and said second type being a non-persistent token type.

20. A wireless terminal, comprising:
    means for generating QoS tokens within said wireless terminal at a rate which is a function of a QoS level associated with the wireless terminal, said QoS tokens being shared by a plurality of applications on said wireless terminal, one of said applications having latency dependent data to communicate and another one of said applications having best effort data to communicate;
    means for allocating QoS tokens to latency dependent data prior to allocating QoS tokens to best effort data, said means for allocating QoS tokens including:
        means for allocating a QoS token which is about to expire to best effort data when there is no latency dependent data waiting to be sent; and
    means for using a generated token to control access to a communications resource.

21. A wireless terminal, comprising:
    at least one processor configured to:
        generate QoS tokens within said wireless terminal at a rate which is a function of a QoS level associated with the wireless terminal, said QoS tokens being shared by a plurality of applications on said wireless terminal, one of said applications having latency dependent data to communicate and another one of said applications having best effort data to communicate;
        allocate QoS tokens to latency dependent data prior to allocating QoS tokens to best effort data, said processor being further configured to allocate a QoS token which is about to expire to best effort data when there is no latency dependent data waiting to be sent, as part of being configured to allocate QoS tokens; and
        use a generated token to control access to a communications resource; and
    a memory coupled to said at least one processor.

22. A wireless terminal, comprising:
    means for generating QoS tokens within said wireless terminal at a rate which is a function of a QoS level associated with the wireless terminal, said QoS tokens including tokens of a plurality of different types, said plurality of different types including a first type and a second type, said first type being a persistent token type and said second type being a non-persistent token type; and
    means for using a generated token to control access to a communications resource, said generated token being a persistent token, said persistent token expiring when access to said communications resource is obtained.

23. A wireless terminal, comprising:
    at least one processor configured to:

generate QoS tokens within said wireless terminal at a rate which is a function of a QoS level associated with the wireless terminal, said QoS tokens including tokens of a plurality of different types, said plurality of different types including a first type and a second type, said first type being a persistent token type and said second type being a non-persistent token type; and use a generated token to control access to a communications resource, said generated token being a persistent token, said persistent token expiring when access to said communications resource is obtained; and a memory coupled to said at least one processor.

* * * * *